Patented Sept. 12, 1950

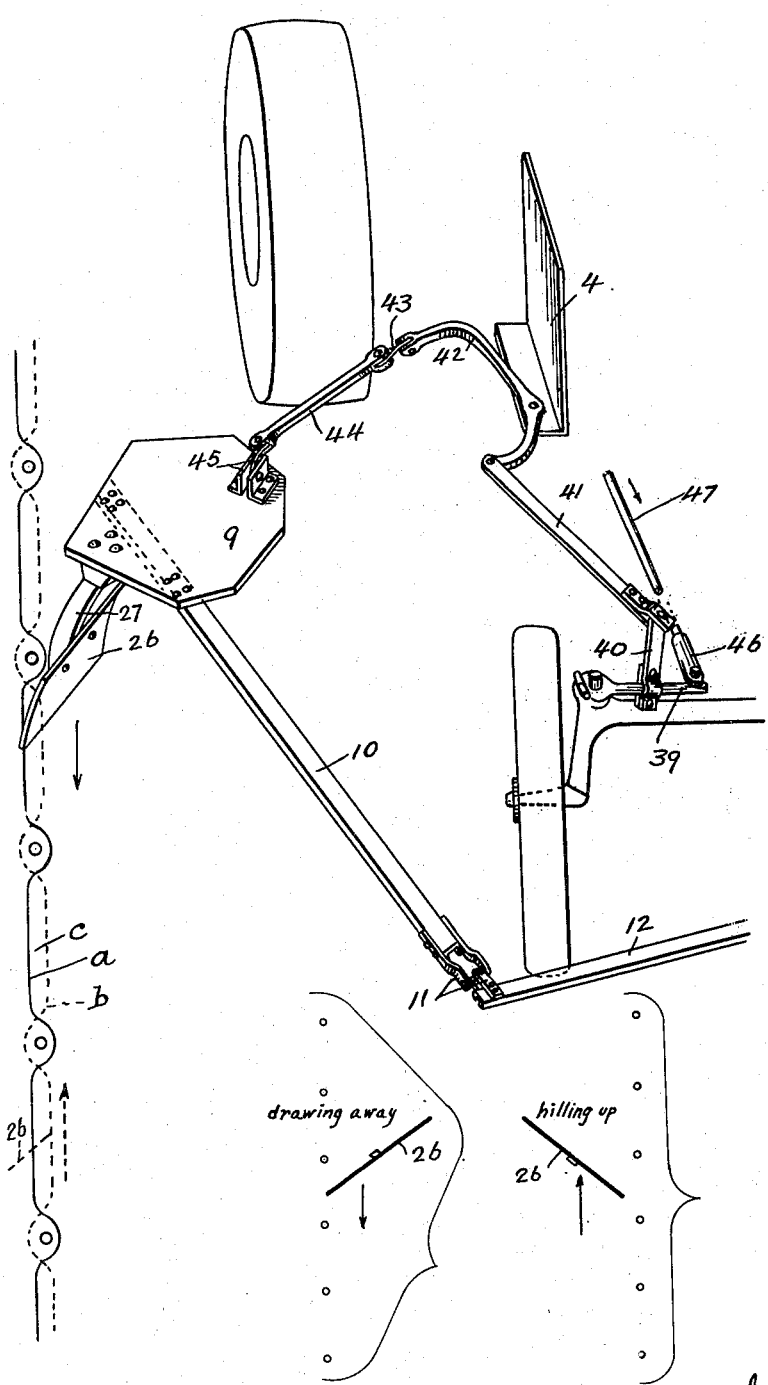

2,522,227

UNITED STATES PATENT OFFICE 2,522,227

VINEYARD CULTIVATOR GUIDED BY THE TRACTOR STEERING MECHANISM

Jacob Bligh Hostetter, St. Catharines, Ontario, Canada, assignor to T. G. Bright & Co. Limited, Niagara Falls, Ontario, Canada, a corporation of the Province of Ontario Application July 14, 1948, Serial No. 38,593

5 Claims. (Cl. 97—137)

1

This invention relates to an implement attachment for cultivating plants, and the objects of the invention are:

1. To control the working depth of a reversible elastically-dominated depending cultivator positioned beyond the path of the wheels of a carrying tractor in an horizontal arc from a fulcrum at one side and preferably in front of the tractor and waggle it round each plant in a row of plants spaced apart, at alternating angles to each plant and at a preferred ratio in relation to and simultaneously with and through the manual manipulation of the steering mechanism of said tractor, thereby easily and rapidly cultivating said plants, in full view of the driver.

2. To provide ample leverage for the reversible depending cultivator longitudinally of the tractor so that the lateral angular and vertical movements thereof may be readily and easily effected.

3. To provide efficient and simple manually-set elastic means to automatically regulate the working depth of the cultivator without interfering with necessary movements thereof.

4. To so support the cultivator that it will automatically tilt on the longitudinal axis of its support in conformity with the contour of the ground and thus promote thorough cultivation.

5. To provide an implement for the purpose set forth that can be attached to various makes of tractors.

6. To provide simple link and lever means between the steering mechanism of the tractor and the cultivator whereby the latter may be readily moved on its leverage.

7. To so support the reversible cultivator that while it moves down a row of plants the earth is shifted longitudinally at one side only thereof and positively drawn away from the plants, or hilled up therearound.

8. To provide a reversible elastically-dominated cultivator, the zone of activity of which is in front of the rear wheels of the tractor, and the shifting means for which is located between said rear and front wheels, thus providing a compact aggroupment of elements that will economize storage space. It is usual to seasonably plow the widest permissible strip of ground between the rows of plants (for example, grape vines, fruit trees, and currant bushes), and in so doing, often earth is unduly heaped up around the stalks or trunks thereof. This surplus earth is injurious to the plant, and therefore by means of this method, it is easily and readily removed while at the same time weeds and grasses are cut and removed from around the plants. To do this work mechanically quickly and efficiently is a vitally necessary requirement in modern cultivation of vineyards owing to the high cost of manual labor.

An implement attachment within this invention comprises a support; a reach pole attached to said support and extending longitudinally of the tractor and fulcrumed thereto preferably at the front end thereof; a reversible cultivator depending below said support; means carried by the tractor, under manual control, from which said support is suspended to be raised and lowered thereby; elastic means carried by the tractor and manually controlled whereby vertical pressure may be regulated against said support and the cultivator to determine working depth of the latter, and link and lever means carried by the tractor intermediate the steering arm and said support whereby said support may be moved through an arc from its fulcrum horizontally to waggle said cultivator laterally of said tractor, as hereinafter more particularly explained.

Fig. 3 is a schematic view of a row of spaced plants showing relatively thereto the path of the supported cultivator when drawing away earth, and the out position of the link and lever means for laterally moving the cultivator.

Fig. 4 is a detail of the supporting means for the upper ends of the bars carrying the springs in Fig. 1.

Figs. 5 and 6 are schematic views showing respectively the positions of the cultivator when "drawing away" and "hilling up."

In the drawings like characters of reference refer to the same parts.

Figure 1:
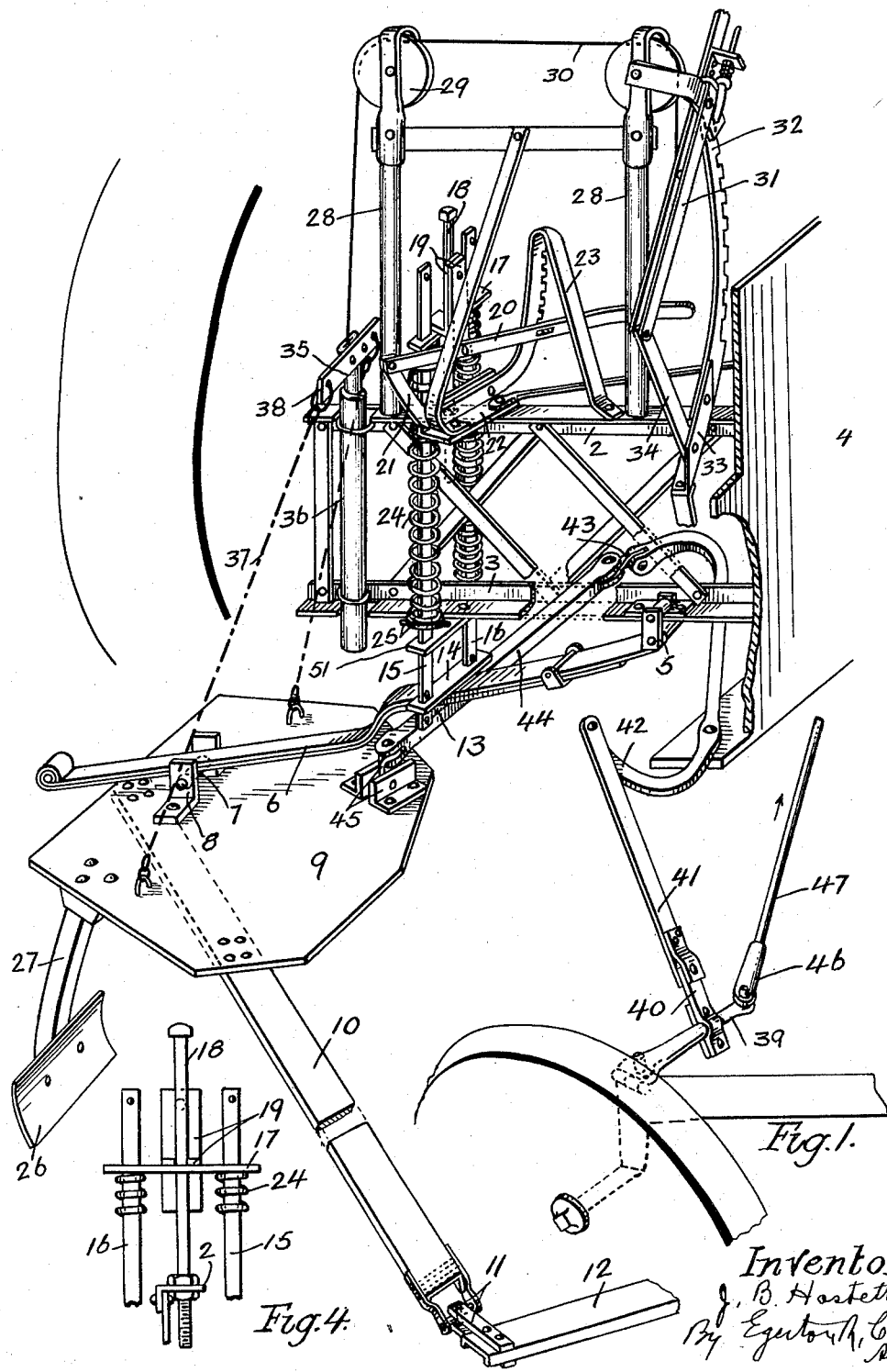
Fig. 1 is a perspective view of the preferred form of mechanism to control the movements and position of the cultivator, showing portions of a tractor supporting same.

Since the cultivator and its support are easily moved in an arc round the fulcrum of the reach pole, the angle of the working face of the cultivator is constantly changed by the steering mechanism as the tractor advances. As the cultivator is, in the preferred form, a dished straight blade, it working face for its whole length directs the removed soil outwardly from the plant in slightly changing angular directions.

To "hill up" the removed earth around the plants, the arm directly carrying the cultivator is uncoupled from its support and recoupled thereto after turning it through an angle of 90°. (See Figs. 5 and 6.)

In its preferred form (Fig. 1) the mechanical embodiment of this invention comprises any suitable frame, the bars 2 and 3, of which are suitably braced together and suitably secured to the plate 4, which in turn is suitably supported by the tractor (not shown).

Coupled at one end thereof by the shackle 5, to the bar 3, is a leaf spring 6, which rests upon a roller 7, journalled in brackets 8, carried by the plate 9. The plate 9, is coupled to a reach pole 10, the outer end of which is coupled by a universal joint 11, to the draw-bar 12, which in turn is carried by the front end of the tractor (not shown).

Clamping the leaf spring 6 between them are plates 13 and 14, supported by the vertical rods 15 and 16, between the lower ends of which lies said leaf spring. The lower ends of the bars 15 and 16, slide through a plate 51, secured to the bar 3. The upper ends of the bars are slidably held in a plate 17, which is braced by a rod 18, which passes through it and is anchored at its lower end in the bar 2. A plate 19, rests upon the plate 17, between the rods 15 and 16, and is pivoted to the lever 20 and secured to the rod 18. The lever 20, is pivoted to the plate 21, which plate is carried by the support 22, secured to the bar 2. The lever 20, coacts with the toothed quadrant 23, in order to regulate the pressure of plate 17, upon the spiral springs 24, mounted on the rods 15 and 16. The springs 24, are vertically supported by the pins and plates 25, carried by said rods, and hence pressure of said springs is exerted through said rods and plate 14, upon the leaf spring 6. The pressure of the springs 24, are at their maximum in Fig. 1. The mechanism just described is used to maintain the cultivator at the desired working depth in the ground, and yet allow any necessary vertical movement thereof under working conditions.

The plate 9, moves longitudinally of the spring 6, and there is ample space between the brackets 8, to allow movement of the plate 9, on its fulcrum provided by the universal coupling 11, without binding against the spring 6.

Any suitable means may be used to raise and lower the plate 9, and hence the cultivator blade or hoe 26, coupled thereto by the arm 27. The preferred means for this purpose comprises a pair of braced standards 28, carried by the bar 2. Journalled in the upper ends of these standards are pulley wheels 29 over which passes a cable 30, connected at one end to the lever 31, of the toothed quadrant 32, which is braced at its upper end by a standard 28, and supported at its lower end by the plate 33, carried by the bar 2. By means of the link 34, fixed to the plate 33, the lower end of the lever 31, is pivotally supported. The other end of the cable 30, is connected to the plunger 35, slidably held in the tubular member 36, suitably carried by the bars 2 and 3. Through the medium of the cables or chains 37, coupling the cross bar 38, carried by the rod 35, to the plate 9, the driver is enabled to use the lever 31, to raise said plate and its cultivator 26, above the ground, or lower it thereto.

Any suitable link and lever means may be used under the control of the driver through the medium of the steering mechanism to move the plate 9, and cultivator 26, round the fulcrum provided by the universal coupling 11, at the desired ratio to the movement of the steering arm 39, when cultivating the plants. The preferred means comprises a link 40, carried by the steering arm and pivoted to the link 41. Pivoted to the link 41, is a lever 42, pivoted to the flange of the plate 4. The lever 42, is coupled by a universal joint 43, with the bar 44, which is coupled to the plate 9, by the universal joint 45. In the position of the parts just described (Figs. 1 and 2) the cultivator is assumed to be in the ground and the said parts 41, to 44, are in a contracted position. If the steering wheel (not shown) is turned clockwise the parts under consideration by means of the steering-rod 47, pivoted to the steering-arm 37, by the socket 46 assume the positions shown in Fig. 3, where the cultivator is lowered and put to work. By alternately moving the steering wheel (not shown) clock-wise and counter-clockwise, the driver waggles the cultivator round the plants.

The link and lever means used preferably operates in a ratio to the movement of the steering arm 39, so that when the said arm is moved through a small arc the advancing end of the cultivator 26, is moved through a comparatively large arc. This ratio may of course be altered, but in practice it has been proven to give excellent results.

Figure 2:
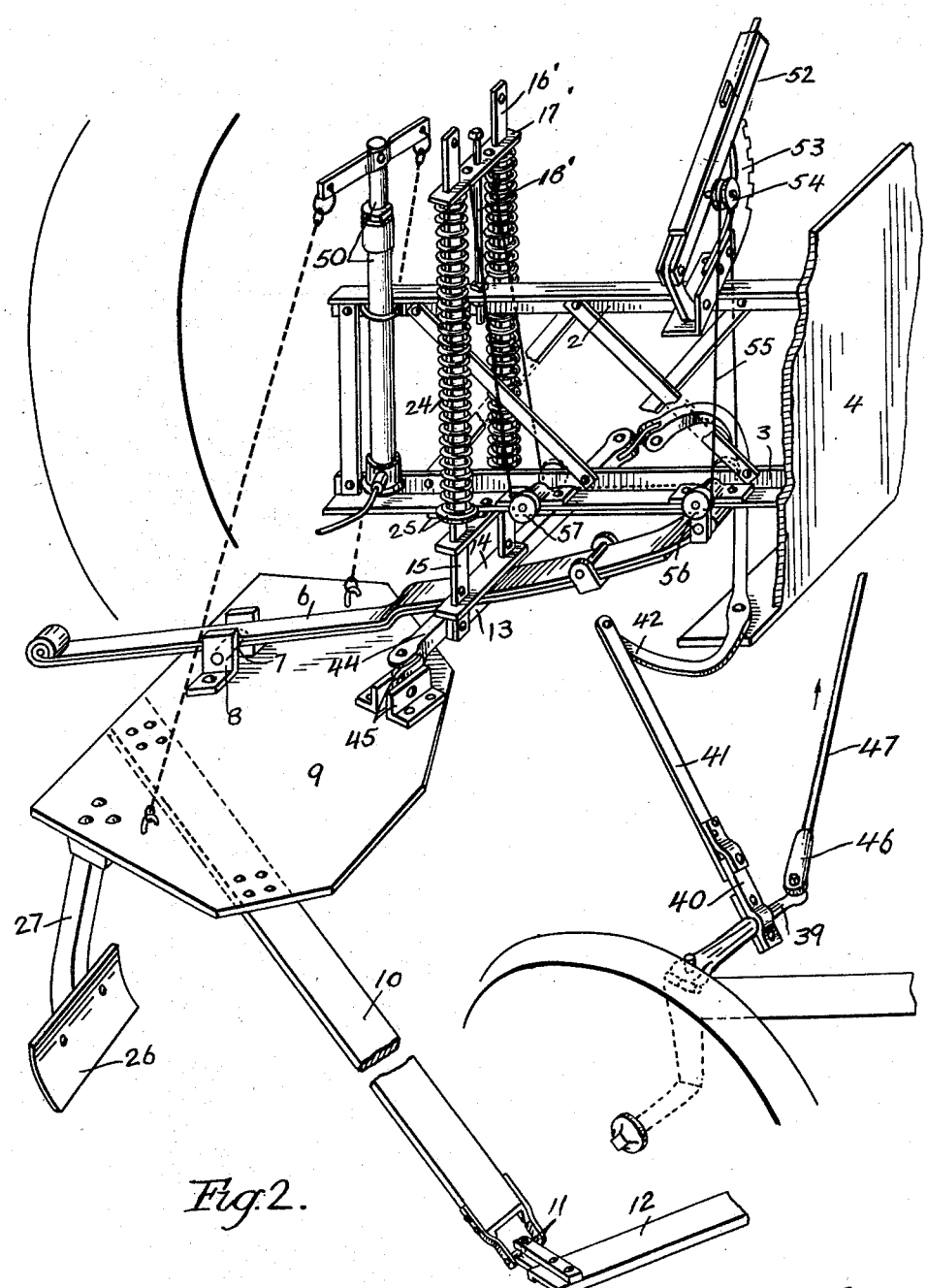
Fig. 2 is a perspective view of an alternative form of means for raising and lowering the cultivator and its supports.

In place of using the mechanism shown in Fig. 1, to raise and lower the cultivator, an hydraulic jack 50, may be used. This jack is coupled to the plate 9, substantially as shown, or in any other suitable manner. The full and dotted lines, a and b, Fig. 3, show the path of the cultivator as it works down each side of a row of plants, and the space c, between these lines shows the area overlapped by the cultivator.

The positions of the cultivator in drawing away the earth and afterwards hilling it up, are shown schematically in Figs. 5 and 6.

When the cultivator is working the chains or cables 37, are slack, and hence the plate 9, is free to be manually moved laterally, and to be tilted into various angular positions to the horizontal by the contour of the ground and thus permit the cultivator to function efficiently.

A depending cultivator as herein identified, means one that is not rigidly coupled to a tractor, nor coupled thereto in such a manner as to have a very circumscribed range of movement, and it is so associated with the tractor to function beyond the path of the tractor wheels that it may freely automatically conform to the contour of the ground while the lateral range of movements thereof is readily determined and easily controlled by the driver.

A lever 52 (Fig. 2) is pivoted to the lower end of the toothed quadrant 53, carried by the bar 2. Carried by the lever 52, is a pulley wheel 54, over which passes a rope or cable 55. One portion of the rope or cable 55, passes down under pulley wheels 56 and 57, journalled in the bar 3. The upper end of said portion is attached to the plate 17' at one side of the rod 18', carried by the bar 2. The other portion of said rope or cable 55, is likewise mounted and secured on the opposite side of the bars 2 and 3.

By means of the parts just described the operator, through the medium of the lever 52, can regulate the pressure of the springs 24, upon the leaf spring 6.

While herein has been described the preferred form of operating mechanism for the cultivator, as illustrated in the drawings, and preferred and alternative forms of mechanism for raising and lowering the cultivator, it must be understood that changes in construction may be made there-

I claim:

1. An implement attachment comprising a support movable about a fulcrum, a cultivator depending therefrom; supporting means adapted to be attached to a tractor; a leaf spring hinged at its inner end to said supporting means and resting in contact with said support; means to raise and lower said support and its cultivator; elastic means under the control of the operator adapted to exert pressure upon said leaf spring; link and lever means mounted on the tractor and connected with said cultivator support, and steering means for the tractor connected with said link and lever means and adapted to coact therewith for the purpose set forth.

2. An implement attachment comprising a support movable about a fulcrum; a cultivator depending therefrom; supporting means adapted to be attached to a tractor; a leaf spring hinged at its inner end to said supporting means and resting in contact with said support; means to raise and lower said support and its cultivator; a pair of rods vertically carried by said supporting means and coupled to said leaf spring; a spiral spring on each rod; manually operated means to regulate pressure of said springs on said leaf spring; link and lever means mounted on the tractor and connected with said cultivator support, and steering means for the tractor connected with said link and lever means and adapted to coact therewith for the purpose set forth.

3. An implement attachment comprising a support movable about a fulcrum; a cultivator depending therefrom; supporting means adapted to be attached to a tractor; a leaf spring hinged at its inner end to said supporting means and resting in contact with said support; means to raise and lower said support and its cultivator; a pair of rods vertically carried by said supporting means and coupled to said leaf spring; a spiral spring on each rod; manually operated means to regulate pressure of said springs on said leaf springs; link and lever means mounted on the tractor and connected with said cultivator support, and steering means for said tractor connected with said link and lever means and adapted to coact therewith for the purpose set forth.

4. In combination a tractor having steering wheels each provided with a steering arm; a support movable about a fulcrum supported by said tractor; a cultivator depending from said support and a series of link-like members pivotally supported by said tractor and hinged together and coupling one of said steering arms and said cultivator support together, for the purpose specified.

5. An implement attachment comprising a support movable about a fulcrum, a cultivator depending therefrom; supporting means adapted to be attached to a tractor; a means hinged at its inner end to said supporting means and adapted to exert yielding pressure against said support; means to raise and lower said support and its cultivator; elastic means under the control of the operator adapted to exert pressure upon said hinged means; link and lever means pivotally supported by said tractor and connected with said cultivator support, and steering means for the tractor connected with said link and lever means and adapted to coact therewith for the purpose set forth.

JACOB BLIGH HOSTETTER.

REFERENCES CITED

The following references are of record in the file of this patent:

UNITED STATES PATENTS

| Number | Name | Date |
| --- | --- | --- |
| 1,310,664 | Klassen | July 22, 1919 |
| 1,588,497 | Rietzke | June 15, 1926 |
| 2,419,331 | Best | Apr. 22, 1947 |
| 2,437,581 | Wray | Mar. 9, 1948 |
| 2,463,684 | Fiorella | Mar. 8, 1949 |